May 25, 1926.
B. E. GETCHELL
1,585,848
ELECTRIC METER ADAPTER
Filed March 14, 1925
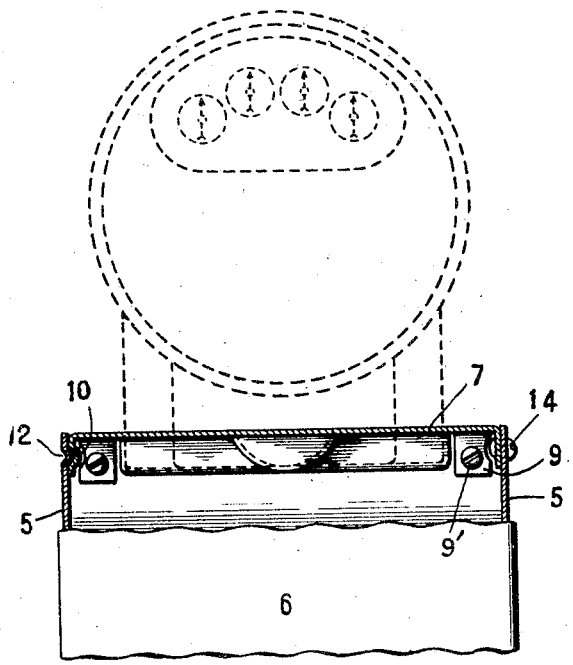
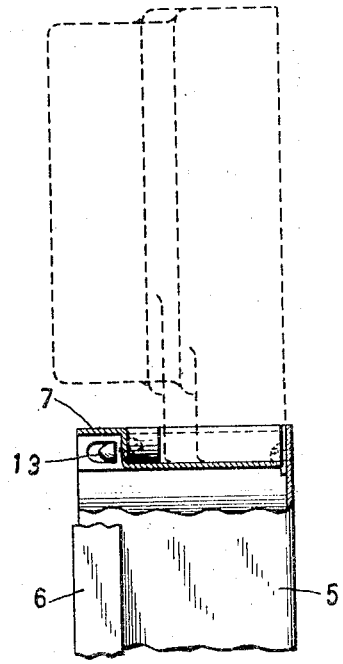
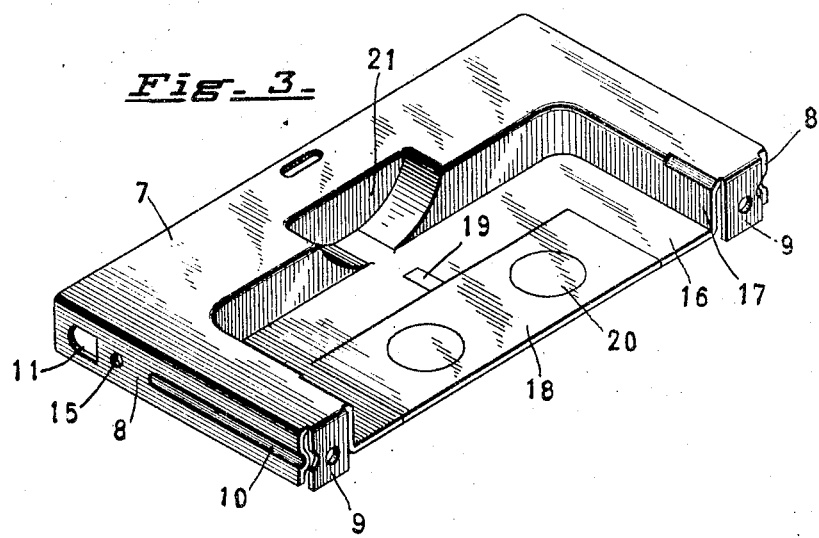
INVENTOR
Benjamin E. Getchell
BY
ATTORNEY Patented May 25, 1926.

1,585,848

UNITED STATES PATENT OFFICE.

BENJAMIN E. GETCHELL, OF PLAINVILLE, CONNECTICUT, ASSIGNOR TO THE TRUMBULL ELECTRIC MANUFACTURING COMPANY, OF PLAINVILLE, CONNECTICUT, A CORPORATION OF CONNECTICUT.

ELECTRIC-METER ADAPTER.

Application filed March 14, 1925. Serial No. 15,673.

My invention relates particularly to switch boxes, and the main object is to provide a construction which is adapted to serve as a means of connection between any one of the electric meters now in common use and a switch box or fuse box, as the case may be.

Another object is to provide an end plate construction which serves interchangeably as an adapter for various types of meters.

For this purpose the end plate of the entrance box, as it may be termed, is provided with a vestibule having one or more knockouts, as they are commonly termed.

Fig. 1 is a front view and partial fragmentary section of the end of an entrance box with the meter adapter and showing in dotted outline two different sizes of meters.

Fig. 2 is a vertical sectional view and side elevation of the same.

Fig. 3 is a perspective view of one form of meter adapter embodying my invention.

The box 5 may be of any suitable construction, preferably of sheet steel as is common in this art, and provided with some suitable form of cover 6. This box is adapted to contain the entrance switch or fuse block, as the case may be.

The end plate 7 is preferably formed of sheet metal with flanges 8 adapted to fit between the sides of the box 5. The back end of the plate is preferably provided with lugs 9 adapted to be secured to the bottom of the box by screws 9'. The flanges 8 may be provided with suitable means such as the groove 10 and the holes 11 for interlocking with the corresponding projections 12 and 13 on the ends of the box. Screws 14 are also preferably inserted through the ends of the box into screw seats 15 to give greater security to the attachment.

A substantial portion of the plate 7 is introverted so as to provide a recess or vestibule extending into the end of the box. This vestibule has a main wall 16 with sides 17. This vestibule is large enough to receive the ends of any standard type of service meter. A part 18 of this main wall 16 is made in the form of what is commonly termed a knockout, that is, partially severed from the main part so that it may be knocked out to provide an opening therethrough for the wires leading to the meter. A supplemental knockout 19 may also be provided to accommodate projections on certain types of meters. The knockout 18 may also itself have one or more smaller knockouts 20 so that the smaller knockouts may be removed if desired without removing the knockout 18. The vestibule has preferably an extension 21 at the upper end to accommodate projections which occur on certain types of meters.

It is customary to install the wiring and entrance box in position a considerable time before the meter is installed, and for that reason it is desirable that the box be entirely closed so that no dirt can enter during the building construction. When the meter is to be installed, a suitable portion of the back wall of the vestibule is knocked out to accommodate the wires connecting the meter to the box. By providing the introverted recess or vestibule in the end plate, it is possible to accommodate almost any size or shape of meters and still maintain a close fit and neat joint between the meter and the box and prevent tampering with the connections.

I claim:

1. A meter adapter box end having an introverted vestibule adapted to house the terminal end of a meter, the bottom of said vestibule being provided with a knockout for permitting passage of conductors.

2. A switch box and an adapter end therefor, said adapter having an introverted vestibule with a bottom wall set in a substantial distance beyond the outer end of the box, said vestibule being shaped to house the terminal end of a meter and said bottom wall having a knockout.

3. A detachable end for a switch box having an introverted vestibule with a centrally disposed small knockout and a larger knockout in the edge of the bottom wall of said vestibule, said vestibule being shaped to house the terminal end of a meter.

4. A switch box having an end plate provided with an introverted vestibule and a knockout member located in the edge of the bottom wall of the vestibule, said vestibule being shaped to house the terminal end of a meter.

5. As an article of manufacture, a detachable combined meter adapter and box end having an integrally connected introverted portion shaped to house the terminal end of a meter, and having a knockout in the bottom of said introverted portion.

BENJAMIN E. GETCHELL.